Patented Jan. 24, 1950

2,495,467

UNITED STATES PATENT OFFICE 2,495,467

THIOETHERS OF POLYALKYLATED CYCLIC SULFONES

Rupert C. Morris, Berkeley, and John L. Van Winkle, San Lorenzo, Calif., assignors to Shell Development Company, San Francisco, Calif., a corporation of Delaware No Drawing. Application January 7, 1946, Serial No. 639,695

4 Claims. (Cl. 260—329)

This invention relates to a novel and particularly useful class of compounds comprising the thioethers of polyalkylated cyclic sulfones. More particularly, the invention pertains to polyalkylated sulfolanyl thioethers. A specific embodiment of the invention comprises the 2,4-dialkylsulfolanyl thioethers.

The thioethers of the invention comprise a five-membered heterocyclic ring consisting of four nuclear carbon atoms and a sulfonyl radical and having at least two alkyl radicals directly attached to one or more of the nuclear carbon atoms, wherein at least one of the nuclear carbon atoms is directly attached by a single bond to a divalent sulfur atom which is linked directly to an organic radical.

The novel polyalkylated sulfolanyl thioethers of the invention comprise a five-membered heterocyclic ring consisting of four saturated nuclear carbon atoms and a sulfonyl radical having at least two alkyl radicals directly attached to one or more of the nucler carbon atoms, wherein at least one of the nuclear carbon atoms is directly attached by a single bond to a divalent sulfur atom which is linked directly to an organic radical and wherein the remaining free bonds of the nuclear carbon atoms are directly attached to members of the group consisting of the hydrogen atoms and organic radicals. The polyalkylated sulfolanyl thioethers may be represented by the formula

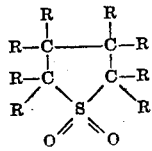

wherein at least one of the R's is the —S—R₁ radical, R₁ representing an organic radical, at least two of the R's are alkyl radicals, and the remaining R's are members of the group consisting of the hydrogen atom, the hydrocarbon radicals and the substituted hydrocarbon radicals.

The organic radicals which are attached to the thio-sulfur atom may be hydrocarbon radicals or substituted hydrocarbon radicals. The substituted hydrocarbon radicals are preferably the halogen-substituted hydrocarbon radicals such as chloromethyl, chlorobutyl, chlorohexyl, chlorocyclohexyl, chloroallyl, chlorocylcohexenyl, bromophenyl, chlorophenyl, bromostearyl, dichlorophenyl, pentachlorophenyl and the like and their homologues and analogues. The organic radicals also include the heterocyclic radicals such as the sulfolanyl, 2,4 - dimethylsulfolanyl, sulfolenyl, thiophenyl, furfuryl, pyridinyl, tetrahydrothiophenyl and tetrahydrofurfuryl radicals, and their homologues and analogues.

The organic radicals which are directly attached to the thiosulfur atom may be hydrocarbon radicals which are saturated or unsaturated. Unsaturated hydrocarbon radicals include the vinyl, isopropenyl, allyl, methallyl, crotyl, tiglyl, cinnamyl, cyclohexenyl, 3,5,5-trimethyl-2-cyclohexenyl and cyclopentadienyl radicals.

The organic radicals which are directly attached to the thiosulfur atom are preferably the saturated hydrocarbon radicals, i.e. the hydrocarbon radicals which are not readily hydrogenatable such as the alkyl, cycloalkyl, aryl and aralkyl radicals. Examples of the saturated hydrocarbon radicals are methyl, ethyl, propyl, isopropyl, butyl, isobutyl, sec-butyl, tert-butyl, amyl, isoamyl, hexyl. heptyl, octyl, cyclohexyl, cyclopropyl, phenyl, cresyl, xylyl, benzyl, 3,3,5-trimethylcyclohexyl, methyl phenyl carbinyl, octadecyl, and ethyl xylyl carbinyl. The saturated hydrocarbon radicals which are directly attached to the thiosulfur atom are more preferably alkyl radicals.

A valuable group of thioethers of the invention comprises those compounds containing a five-membered heterocyclic ring consisting of four nuclear carbon atoms and a sulfonyl radical and having two alkyl radicals directly attached to two different nuclear carbon atoms, wherein one of the four nuclear carbon atoms is directly attached by a single bond to a divalent sulfur atom which is linked directly to a saturated hydrocarbon radical and wherein the remaining free bonds of the nuclear carbon atoms are directly attached to hydrogen atoms.

The alkyl radicals which are directly attached to the cyclic sulfone nucleus are preferably the lower alkyl radicals containing not more than four carbon atoms, i. e., the methyl, ethyl, propyl, isopropyl, n-butyl, sec-butyl and tert-butyl radicals. However, useful compounds are also formed wherein alkyl radicals containing more than four carbon atoms are directly attached to the cyclic sulfone nucleus. Examples of the higher alkyl radicals are amyl, hexyl, isoamyl, 2-methylamyl, heptyl, octyl, octadecyl and the like.

The organic radicals which R may represent may be cyclic or acyclic, saturated. unsaturated or aromatic, and include the alkyl, aryl, alkenyl, aralkyl, aralkenyl, alkenaryl, cycloalkyl, cycloalkenyl and heterocyclic radicals such as methyl, ethyl, propyl, isopropyl, butyl, isobutyl, secondary butyl, tertiary butyl, amyl, hexyl, vinyl, allyl, chloroallyl, methallyl, crotyl, butadienyl, phenyl, dichlorophenyl, pentachlorophenyl, xylyl, benzyl, styryl, cinnamyl, sulfolanyl, 2,4-dimethyl-3-sulfolanyl, sulfolenyl, furfuryl, tetrahydrofurfuryl, tetrahydrothiophenyl, cyclohexyl, 3,3,5-trimethylcyclohexyl, cyclohexenyl, 3,5,5-trimethyl-2-cyclohexenyl, 3,5,5-trimethyl-3 - cyclohexenyl, cyclopentadienyl, propargyl, and the like and their homologues. However, when R represents an organic radical, it is preferably a hydrocarbon radical, and more preferably a hydrocarbon radical of saturated character, i. e., not readily hydrogenatable, such as the alkyl, cycloalkyl, aryl, aralkyl and alkaryl radicals. Examples of the saturated hydrocarbon radicals include methyl, ethyl, propyl, isopropyl, butyl, isobutyl, secondary butyl, tertiary butyl, cyclohexyl, cyclopropyl, phenyl, xylyl, benzyl, cresyl and 3,3,5-trimethylcyclohexyl.

Saturated polyalkylsulfolanyl thioethers having a thio-sulfur atom on the nuclear carbon atom in the 4-position directly attached to an alkyl radical, and having an alkyl group on each of the carbon atoms in the 2- and 4-positions of the sulfolane ring, possess unexpectedly valuable properties which make them of particular use in various industrial applications. An example of such particularly valuable alkyl 2,4-dialkyl-sulfolanyl sulfide is amyl 2,4-dimethyl-4-sulfolanyl sulfide.

The numbering system of the sulfolane ring is indicated below:

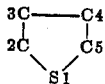

This is in accordance with the accepted system of numbering as exemplified by the compounds of this type of ring structure given on page 44 of Patterson and Capell, The Ring Index, Reinhold Publishing Corp., New York, 1940; Am. Chem. Soc. Monograph No. 84. The system may be exemplified by the compound having the structure:

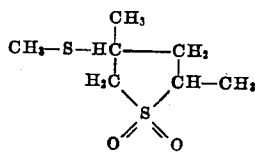

which is termed methyl 2,4-dimethyl-4-sulfolanyl thioether, or, more conveniently methyl 2,4 dimethyl-4-sulfolanyl sulfide.

Thioethers of the type of 3-sulfolanyl thioether, methyl 4-methyl-3-sulfolen - 3-yl sulfide, 3-methyl-4-sulfolenyl thioether and tert-butyl-4 methyl-3-sulfolen-3-yl sulfide are disclosed in the prior art. In all of these compounds, the sulfolane or sulfolene nucleus has no more than one alkyl radical directly attached thereto. Novel compounds have now been prepared wherein the sulfolane nucleus has at least two alkyl radicals directly attached to one or more nuclear carbon atoms. Surprisingly, it has been found that the thioethers of polyalkylated cyclic sulfone of the invention, and particularly the saturated 2,4-dialkylsulfolanyl thioethers, possess inherent properties which are markedly superior to those of the cyclic sulfone thioethers containing no more than one alkyl substituent on the heterocyclic nucleus. These properties could not be foreseen, and they are of such a nature as to make the compounds of the invention particularly useful in various applications.

The polyalkylated sulfolanyl thioethers of the invention may be prepared by any suitable method. A particularly convenient method for the preparation of the polyalkylsulfolanyl thioethers comprises reacting a polyalkylsulfolene such as a 2,4-dialkyl-3-sulfolene with a mercaptan, generally in the presence of a basic-reacting substance, preferably a caustic such as sodium hydroxide. The saturated mercaptans may be represented by the formula $R_1$—SH wherein $R_1$ is a saturated hydrocarbon or substituted hydrocarbon radical, such as an alkyl, aryl, alkaryl, aralkyl, and cycloalkyl or heterocyclic radical. The saturated mercaptans may be prepared by reacting the corresponding saturated organic halide with sodium hydrosulfide. Suitable saturated mercaptans which may be reacted are methyl mercaptan, ethyl mercaptain, propyl mercaptan, isopropyl mercaptan, butyl mercaptan, isobutyl mercaptan, sec-butyl mercaptan, tert-butyl mercaptan, amyl mercaptan, isoamyl mercaptan, hexyl mercaptan, cyclohexyl mercaptan, 3,3,5-trimethylcyclohexyl mercaptan, phenyl mercaptan, benzyl mercaptan, cresyl mercaptan, xylyl mercaptan, and the like and their homologues. The mercaptans may be reacted singly or in mixtures of two or more saturated mercaptans.

When a polyalkysulfolene having the double bond between two nuclear carbon atoms one of which is directly attached to the sulfonyl radical, is reacted with the saturated mercaptan, a saturated polyalkyl-3-sulfolanyl thioether is produced. When the saturated mercaptan is reacted with a polyalkyl-3-sulfolene, i. e., a sulfolene having the double bond between two nuclear carbon atoms each of which is once removed from the sulfonyl radical, a saturated polyalkyl-3-sulfolanyl thioether is also formed; for example amyl mercaptan reacted with 2,4-dimethyl-3-sulfolene produces amyl 2,4-dimethyl-4-sulfolanyl sulfide.

A polyalkylsulfolane, such as a 2,4-dialkyl-sulfolane, having more than one thioxy radical directly attached to one or more of the nuclear carbon atoms of the sulfolane nucleus, may be prepared by reacting the corresponding polyalkysulfolenyl thioether with a mercaptan.

The novel polyalkylsulfolanyl thioethers of the invention find utility in a large variety of industries. For example, the saturated thioethers may be used as insecticides, fungicides and parasiticides or as ingredients of insecticidal, fungicidal and parasiticidal compositions, and as ingredients for use in the manufacture of varnishes, polishes, and the like. Also, these novel compounds may be employed in the preparation of natural or synthetic rubbers, resins, plastics, etc. The alkyl 2,4-dialkyl-4-sulfolanyl sulfides, particularly, have been found to be of outstanding value as plasticizers for natural or synthetic rubbers. Moreover, the saturated polyalkylsulfolanyl thioethers may be further reacted, e. g. sulfurized, sulfated, or the like, to produce valuable substances to be used as addition agents in lubricating oils, greases, and as detergents, as well as for a variety of other purposes.

The following examples serve to illustrate the invention.

*Example I*

Amyl 2,4-dimethyl-4-sulfolanyl sulfide was prepared by reacting about 296 parts by weight of 2,4-dimethyl-3-sulfolene and about 13 parts by weight of approximately 85% potassium hydroxide with about 717 parts by weight of amyl mercaptans at a temperature of about 60° C. The mixture was allowed to stand at about 60° C. for several hours and was washed with dilute sodium hydroxide and distilled. The product was recovered boiling at 154° C. to 159° C. at 2 mm. and having the following physical characteristics:

$n_D^{20}$ ------------------------------------- 1.5044
$d_4^{20}$ ------------------------------------- 1.02

Example II

Amyl mercaptans and 2,4-dimethyl-3-sulfolene were reacted according to the procedure in Example I, but in a pressure bottle at about 90° C. to about 95° C. to produce amyl 2,4-dimethyl-4-sulfolanyl sulfide.

Example III

Following the procedure described in Example I, n-butyl mercaptan and 2,4-diethyl-3-sulfolene are reacted in the presence of sodium hydroxide to produce n-butyl 2,4-diethyl-4-sulfolanyl sulfide.

Example IV

When isopropyl mercaptan and 2,4-dimethyl-3-sulfolene are reacted according to the process of Example I, isopropyl 2,4-dimethyl-4-sulfolanyl sulfide is formed.

Example V 3,3,5-trimethylcyclohexyl mercaptan and 2,4-dimethyl-3-sulfolene are reacted in the presence of potassium hydroxide according to the procedure described in Example II to obtain 3,3,5-trimethylcyclohexyl 2,4-dimethyl-4-sulfolanyl sulfide.

Example VI

Thiophenol and 2,4-dipropyl-3-sulfolene may be reacted in the presence of potassium hydroxide according to the procedure described in Example I to produce phenyl 2,4-dipropyl-4-sulfolanyl sulfide.

Example VII

Allyl mercaptan and 2,4-dimethyl-3-sulfolene are reacted in the presence of sodium hydroxide at a temperature of about 45° C. to produce allyl, 2,4-dimethyl-4-sulfolanyl sulfide.

According to the general procedures outlined above, the following novel compounds are prepared: tert-butyl 2,4-dipropyl-4-sulfolanyl sulfide, methyl 2-methyl-4-ethyl-3-sulfolanyl sulfide, propyl 2-ethyl-4-propyl-3-sulfolanyl sulfide, benzyl 2,4-diisopropyl-4-sulfolanyl sulfide, xylyl 2,4-dibutyl-3-sulfolanyl sulfide, dichlorophenyl 2,4-dimethyl-3-sulfolanyl sulfide, di(2,4-dimethyl-3-sulfolanyl) sulfide, and furfuryl 2,4-dimethylsulfolanyl sulfide. Other saturated thioethers of cyclic sulfones which may be prepared are methyl 2,3,4-trimethyl-3-sulfolanyl sulfide, isopropyl 2,4,5-triethyl-3-sulfolanyl sulfide, butyl 2,4-dimethyl-3-ethyl-4-sulfolanyl sulfide, amyl 2,2,4-trimethyl-3-sulfolanyl sulfide, ethyl 2,5-dimethyl-3-sulfolanyl sulfide, cyclohexyl 3,5-dipropyl-4-sulfolanyl sulfide, cresyl 2,5-dibutyl-3-sulfolanyl sulfide, methyl 2,3,4,5-tetramethyl-3-sulfolanyl sulfide.

We claim as our invention:
1. Amyl 2,4-dimethyl-4-sulfolanyl sulfide.
2. A compound having the structural formula

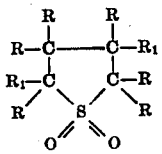

wherein the $R_1$'s represent alkyl radicals, at least one of the R's is the radical —S—R' where R' represents an alkyl radical, and the remaining R's are hydrogen atoms.

3. A compound having the structural formula

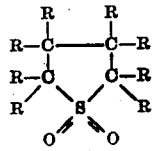

wherein at least one R on each of two of the nuclear carbon atoms is an alkyl radical, at least one R is the radical —S—R' where R' represents a hydrocarbon radical, and the remaining R's are selected from the group consisting of hydrogen atoms and alkyl radicals.

4. 3,3,5-trimethylcyclohexyl 2,4-dimethyl-4-sulfolanyl sulfide.

RUPERT C. MORRIS.
JOHN L. VAN WINKLE.

REFERENCES CITED

The following references are of record in the file of this patent:

UNITED STATES PATENTS

| Number | Name | Date |
|---|---|---|
| 2,291,798 | Delfs | Aug. 4, 1942 |
| 2,357,344 | Morris and Evans | Sept. 5, 1944 |
| 2,393,925 | Morris et al. | Jan. 29, 1946 |